ALBERT WINDECK.
Improvement in Corn Planters.

No. 124,926. Patented March 26, 1872.

Figure 1:
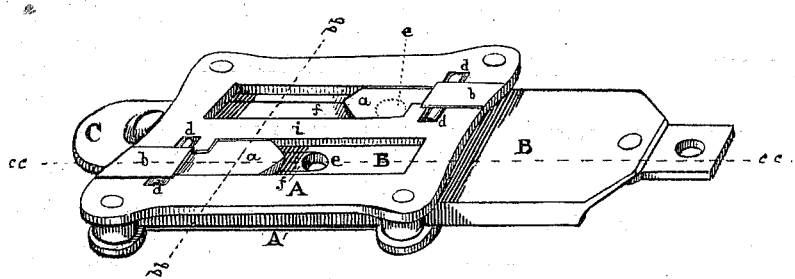
Figure 2:
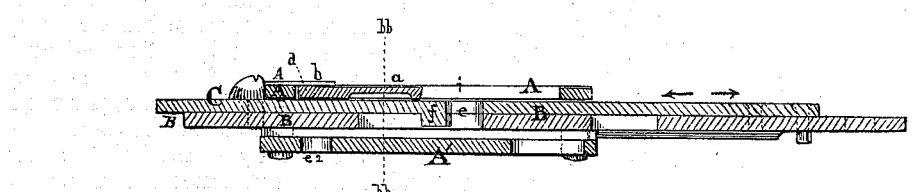

Sec. along line bb_bb_ in figs 1 & 2.

Witnesses
John Williams
Calvin Marston

Albert Windeck
by Edmund Thurston
his Atty 124,926

UNITED STATES PATENT OFFICE.

ALBERT WINDECK, OF PEORIA, ILLINOIS.

IMPROVEMENT IN CORN-PLANTERS.

Specification forming part of Letters Patent No. 124,926, dated March 26, 1872.

*To all whom it may concern:*

Be it known that I, ALBERT WINDECK, of the city of Peoria, in the county of Peoria, and in the State of Illinois, have invented a Cut-off Valve or Trap for Corn-Planting Machine; and do hereby declare that the following is a full, clear, and exact description thereof, reference being had to the annexed drawing making a part of this specification, in which like letters of reference refer to like parts, and in which—

Figure 3:
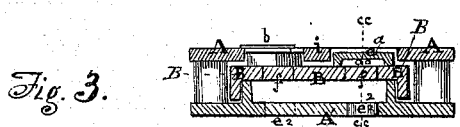
Figure 4:
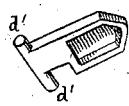
Figure 5:
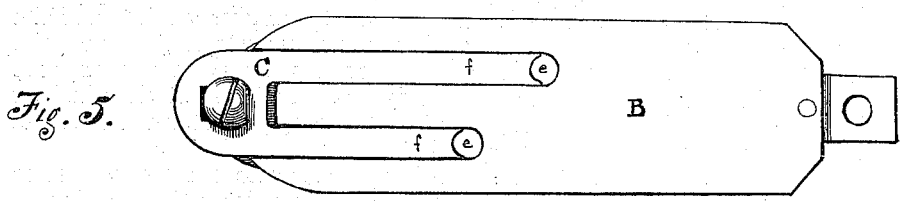
Figure 6:
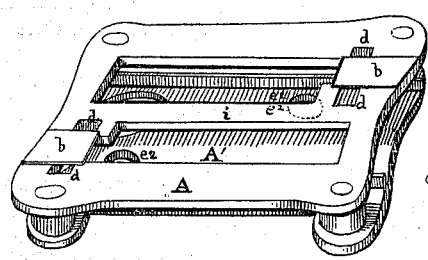

Figure 1 represents a perspective view of the cut-off valves *a a* and the rest of the "first dropper;" Fig. 2, a longitudinal vertical section of same through the line *c c c c*, Figs. 1 and 3; Fig. 3, a vertical transverse section of same through line *b b b b*, Fig. 2; Fig. 4, a perspective view of the under surface of cut-off valve; Fig. 5, plan of sliding cut-off plate; Fig. 6, perspective view of upper and lower plates of the dropper (first dropper) with the cut-off valves and the sliding cut-off plate removed.

Scale of drawing, four inches to the foot.

This invention consists in so constructing the cut-off valves, which admit the seed or corn from the seed-box into the dropper as to obviate the cutting or mutilation of said seed. I make the cut-off valves *a a* loose, pivoting them behind their points, so as to rise on encountering a grain of corn which might lodge between the said point and the edge of the dropper-hole, over which the valve slides. The valves *a a* are also made hollow beneath, but touch (*i. e.*, the portion of valve around the hollow,) the plate all round said concavity.

A represents the usual slotted plate forming the bottom of the seed-box and the upper surface of the corn-dropper. The slot opens down onto the sliding plate or middle cut-off B, and is divided longitudinally by a rib or partition, *i*, and in the direction of the motion of the plate B. One of the valves or cut-offs, *a a*, is pivoted in each slot, but at a reverse end of each slot. For this purpose recesses open off from the sides of the slots near the end of same to retain the pivot-arms of the respective valves, which pivot-arms *d′ d′* are confined within these recesses or sockets by plates or flat springs, or an equivalent, *b b*. These valves or cut-offs are of an oblong form, and extend about half way along their respective slots, with which they also correspond in width. They each terminate in the rear with transverse arms or pivots *d d*, above mentioned, are hollowed on their under surfaces, and have a beveled point in the model and drawing, but are equally effective in parting the seed if made straight; and the upper edge overhangs the lower one, so that contact with seed between this point and the hole *e e* will cause the valve to rise and not cut the seed. B is the sliding or middle cut-off plate, connected usually with the corresponding plates in the other seed-box by a bar, not seen in drawing. It is fitted with the usual regulator, C, having the arms *f f* for regulating the size or capacity of the two holes for corn, *e e*, which holes are respectively passed under a corresponding valve or cut-off, *a a*, in the ordinary manner of these machines.

The operation of this dropper-valve is as follows: At every approach of the holes *e e* to their respective valves *a a*, the seed contained in a hole, if too full, is thrown off by the point of the valve *a*; or if a grain of corn happens to be above the level of the hole, and at the outer edge of the same, the overhanging edge of the point is, on contact with the grain of corn, thrown upward without bruising or cutting the same, or injuring its vitality, and the valve again recovers its normal position, the hollowed interior of the valve *a* allowing the latter to lie flat over the hole, notwithstanding that a grain or two may project above the level of the hole.

The rib *i* is to separate the two valves or cut-offs *a a*, and to facilitate their action in filling the holes, and to prevent grains from getting under the sides and pivot of the said valves *a a*.

What I claim as my invention is—

The stationary cut-off plate A, provided with rib or partition *i*, in combination with the loosely-pivoted hollow cut-off valves *a a* and flat spring *b b*, substantially as set forth.

In testimony that I claim the foregoing cut-off valve I have hereunto set my hand this 2d day of December, 1871.

ALBERT WINDECK.

Witnesses:
HENRY W. WELLS,
JAMES M. MORSE.